(12) United States Patent
Kang et al.

(10) Patent No.: US 11,265,033 B2
(45) Date of Patent: Mar. 1, 2022

(54) ELECTRONIC DEVICE FOR RECEIVING RADIO BROADCAST USING EXTERNAL ELECTRONIC DEVICE CAPABLE OF PROCESSING RADIO SIGNAL, THE EXTERNAL ELECTRONIC DEVICE, AND METHOD OF OPERATING THE ELECTRONIC DEVICE

(71) Applicant: Samsung Electronics Co., Ltd., Suwon-si (KR)

(72) Inventors: Shinhyuck Kang, Suwon-si (KR); Hyunil An, Suwon-si (KR); Wookwang Lee, Suwon-si (KR); Jaebyeong Han, Suwon-si (KR); Minjung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 16/851,940

(22) Filed: Apr. 17, 2020

(65) Prior Publication Data

US 2021/0028804 A1 Jan. 28, 2021

(30) Foreign Application Priority Data

Jul. 25, 2019 (KR) .......................... 10-2019-0090285

(51) Int. Cl.
*H04B 1/18* (2006.01)
*H04B 1/00* (2006.01)
(Continued)

(52) U.S. Cl.
CPC ............... *H04B 1/18* (2013.01); *G06F 3/162* (2013.01); *H04B 1/0003* (2013.01); *H04M 1/72409* (2021.01); *H04R 1/1041* (2013.01)

(58) Field of Classification Search
CPC ..... H04B 1/18; H04B 1/0003; H04M 1/72409; G06F 3/162; H04R 1/1041
See application file for complete search history.

(56) References Cited

U.S. PATENT DOCUMENTS 7,702,403 B1 * 4/2010 Gladwin ................. G06F 3/162
700/94
8,483,401 B2 7/2013 Sampimon et al.
(Continued)

FOREIGN PATENT DOCUMENTS

JP 5799852 B2 9/2015
JP 2016001916 A * 1/2016
(Continued)

OTHER PUBLICATIONS

Glazar, Bostjan et al., FM RDS PnP radio receiver, 2003, IEEE EUROCON, 114-117 (Year: 2003).*
(Continued)

*Primary Examiner* — Lewis G West
(74) *Attorney, Agent, or Firm* — Jefferson IP Law, LLP

(57) ABSTRACT

A method of operating the electronic device is provided. The electronic device includes a universal serial bus (USB) connector connectable to an external electronic device including a radio reception circuit configured to receive a radio signal and to convert the received radio signal into a digital signal, and a signal processing circuit configured to generate a sound corresponding to the digital signal based on a control signal transmitted by the electronic device, and a processor. The processor may be configured to: receive information of the external electronic device in response to detecting that the external electronic device is connected to the USB connector, determine whether the external electronic device is capable of processing the radio signal based on the information of the external electronic device, activate a radio framework configured to control a radio reception (Continued)

function of the external electronic device in response to identifying that the external electronic device is capable of processing the radio signal, and control the external electronic device based on the operation of the USB framework, which receives the control signal generated by the radio framework. In addition, various embodiments are possible.

19 Claims, 8 Drawing Sheets

(51) Int. Cl.
*H04R 1/10* (2006.01)
*G06F 3/16* (2006.01)
*H04M 1/72409* (2021.01)

(56) References Cited

U.S. PATENT DOCUMENTS

| | | |
|---|---|---|
| 2005/0190932 A1 | 9/2005 | Woo et al. |
| 2008/0021952 A1* | 1/2008 | Molinie .............. H04L 12/2803 709/203 |
| 2012/0121102 A1* | 5/2012 | Jang ....................... H01Q 21/30 381/74 |
| 2012/0122522 A1* | 5/2012 | Jang ......................... H01Q 1/10 455/557 |
| 2013/0237283 A1 | 9/2013 | Harrison et al. |
| 2014/0009879 A1 | 1/2014 | Yoshino et al. |
| 2014/0289522 A1* | 9/2014 | Moran ................ H04M 1/0256 713/168 |
| 2016/0286019 A1* | 9/2016 | Broadley .......... H04M 1/72412 |
| 2018/0060270 A1 | 3/2018 | Schnell et al. |
| 2019/0287549 A1* | 9/2019 | Poulsen .................. G06F 3/162 |
| 2020/0333998 A1* | 10/2020 | Lee ......................... G06F 3/162 |
| 2020/0356335 A1* | 11/2020 | Xiao ...................... H01Q 1/243 |

FOREIGN PATENT DOCUMENTS

| | | | |
|---|---|---|---|
| KR | 10-2013-0014752 A | 2/2013 | |
| KR | 10-2016-0141426 A | 12/2016 | |
| KR | 10-2018-0020620 A | 2/2018 | |
| KR | 10-2018-0108225 A | 10/2018 | |
| KR | 10-2019-0021776 A | 3/2019 | |
| WO | WO-2017181708 A1 * | 10/2017 | .............. H04R 3/00 |
| WO | WO-2020029990 A1 * | 2/2020 | .............. H04B 1/00 |

OTHER PUBLICATIONS

International Search Report dated Jul. 17, 2020, issued in International Patent Application No. PCT/KR2020/005158.

* cited by examiner

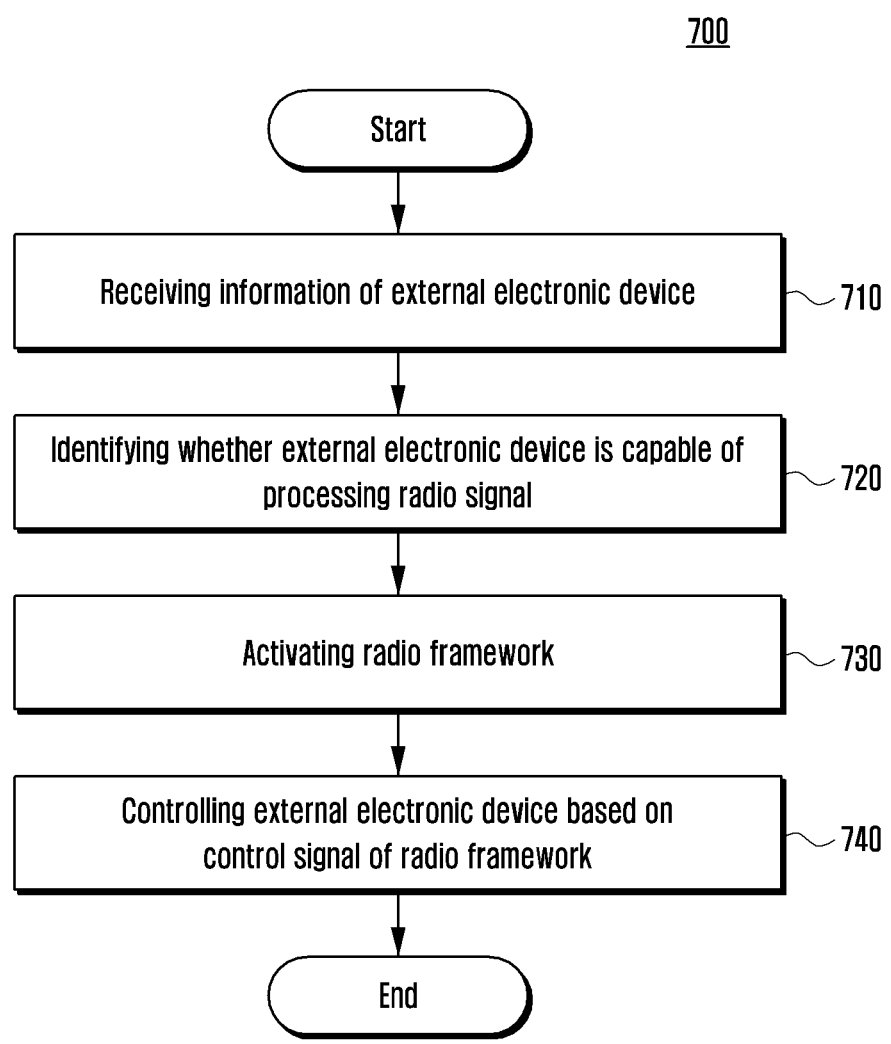

ELECTRONIC DEVICE FOR RECEIVING RADIO BROADCAST USING EXTERNAL ELECTRONIC DEVICE CAPABLE OF PROCESSING RADIO SIGNAL, THE EXTERNAL ELECTRONIC DEVICE, AND METHOD OF OPERATING THE ELECTRONIC DEVICE

CROSS-REFERENCE TO RELATED APPLICATION(S)

This application is based on and claims priority under 35 U.S.C. § 119(a) of a Korean patent application number 10-2019-0090285, filed on Jul. 25, 2019, in the Korean Intellectual Property Office, the disclosure of which is incorporated by reference herein in its entirety.

BACKGROUND

1. Field

The disclosure relates to an electronic device and a method of operating the electronic device. More particularly, the disclosure relates to an electronic device that receives a radio broadcast using an external electronic device capable of processing a radio signal, the external electronic device, and a method of operating the electronic device.

2. Description of Related Art

Various electronic devices such as smart phones, tablet personal computers (PCs), portable multimedia players (PMPs), personal digital assistants (PDAs), laptop personal computers (PCs), and wearable devices, have been distributed.

An electronic device may provide various contents in order to provide various user experiences. In particular, an electronic device may provide a radio broadcast to a user by receiving and outputting the radio broadcast. When an electronic device is connected to an external electronic device (e.g., a headset or an earphone), the external electronic device may include an antenna for receiving a radio broadcast. The electronic device may receive a radio broadcast signal using an antenna included in the external electronic device, and may output the radio broadcast through a speaker provided in the external electronic device or the electronic device using a radio broadcast processor that processes the radio broadcast signal.

The above information is presented as background information only to assist with an understanding of the disclosure. No determination has been made, and no assertion is made, as to whether any of the above might be applicable as prior art with regard to the disclosure.

SUMMARY

Recently, electronic devices have become thinner in order to enhance the aesthetics thereof. In order to provide thin electronic devices, electronic device manufacturers implement a scheme in which a 3.5 mm jack for connecting an earphone or a headset is removed and an earphone or a headset is connected using a connector (e.g., a universal serial bus (USB) C-type connector) provided in an electronic device.

When the electronic device receives a radio broadcast signal using an earphone or a headset as an antenna, the received signal may be transmitted to the electronic device through the connector. When the radio broadcast signal is received, a phenomenon in which radio reception performance is degraded may occur due to noise caused by data signals transmitted/received through the connector or other components in the electronic device.

Aspects of the disclosure are to address at least the above-mentioned problems and/or disadvantages and to provide at least the advantages described below. Accordingly, an aspect of the disclosure is to provide an apparatus and method of operating an electronic device including a universal serial bus (USB) connector connectable to an external electronic device.

Another aspect of the disclosure is to provide an electronic device and a method of operating the electronic device are intended to improve radio broadcast reception performance.

Additional aspects will be set forth in part in the description which follows and, in part, will be apparent from the description, or may be learned by practice of the presented embodiment.

In accordance with an aspect of the disclosure, an electronic device is provided. The electronic device includes a USB connector connectable to an external electronic device including a radio reception circuit configured to receive a radio signal and to convert the received radio signal into a digital signal, and a signal processing circuit configured to generate a sound corresponding to the digital signal based on a control signal transmitted by the electronic device, and a processor. The processor may be configured to: receive information of the external electronic device in response to detecting that the external electronic device is connected to the USB connector, determine whether the external electronic device is capable of processing the radio signal based on the information of the external electronic device, activate a radio framework configured to control a radio reception function of the external electronic device in response to identifying that the external electronic device is capable of processing the radio signal, and control the external electronic device based on the operation of the USB framework, which receives the control signal generated by the radio framework.

In accordance with another aspect of the disclosure, an electronic device operating method is provided. The electronic device includes an operation of receiving information of an external electronic device in response to detecting that the external electronic device is connected to a USB connector, wherein the external electronic device includes a radio reception circuit configured to receive a radio signal and to convert the received radio signal into a digital signal, and a signal processing circuit configured to generate a sound corresponding to the digital signal based on a control signal transmitted by the electronic device, an operation of determining whether the external electronic device is capable of processing the radio signal based on the information of the external electronic device, an operation of activating a radio framework configured to control a radio reception function of the external electronic device in response to identifying that the external electronic device is capable of processing the radio signal, and an operation of controlling the external electronic device based on the operation of the USB framework, which receives the control signal generated by the radio framework.

In an electronic device and an electronic device operating method according to various embodiments, a processor for processing a radio broadcast signal in an external electronic device is implemented, and the external electronic device is caused to process and output a radio broadcast signal under the control of the electronic device. Thus, it is possible to prevent a phenomenon in which radio reception performance is degraded due to noise caused by data signals transmitted and received through the connector or other components in the electronic device.

In an electronic device and an electronic device operating method according to various embodiments, a processor for processing a radio broadcast signal in an external electronic device is implemented, and the external electronic device is caused to process and output a radio broadcast signal under the control of the electronic device. Thus, an electronic device that does not include a processor for processing a separate radio broadcast signal is also capable of implementing radio broadcast reception.

In an electronic device and a method of operating the electronic device according to various embodiments, since the framework, which performs control for receiving a radio broadcast, is implemented using a universally used USB HOST application programming interface (API), it is possible to improve compatibility.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a flowchart illustrating operations of an electronic device operating method according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
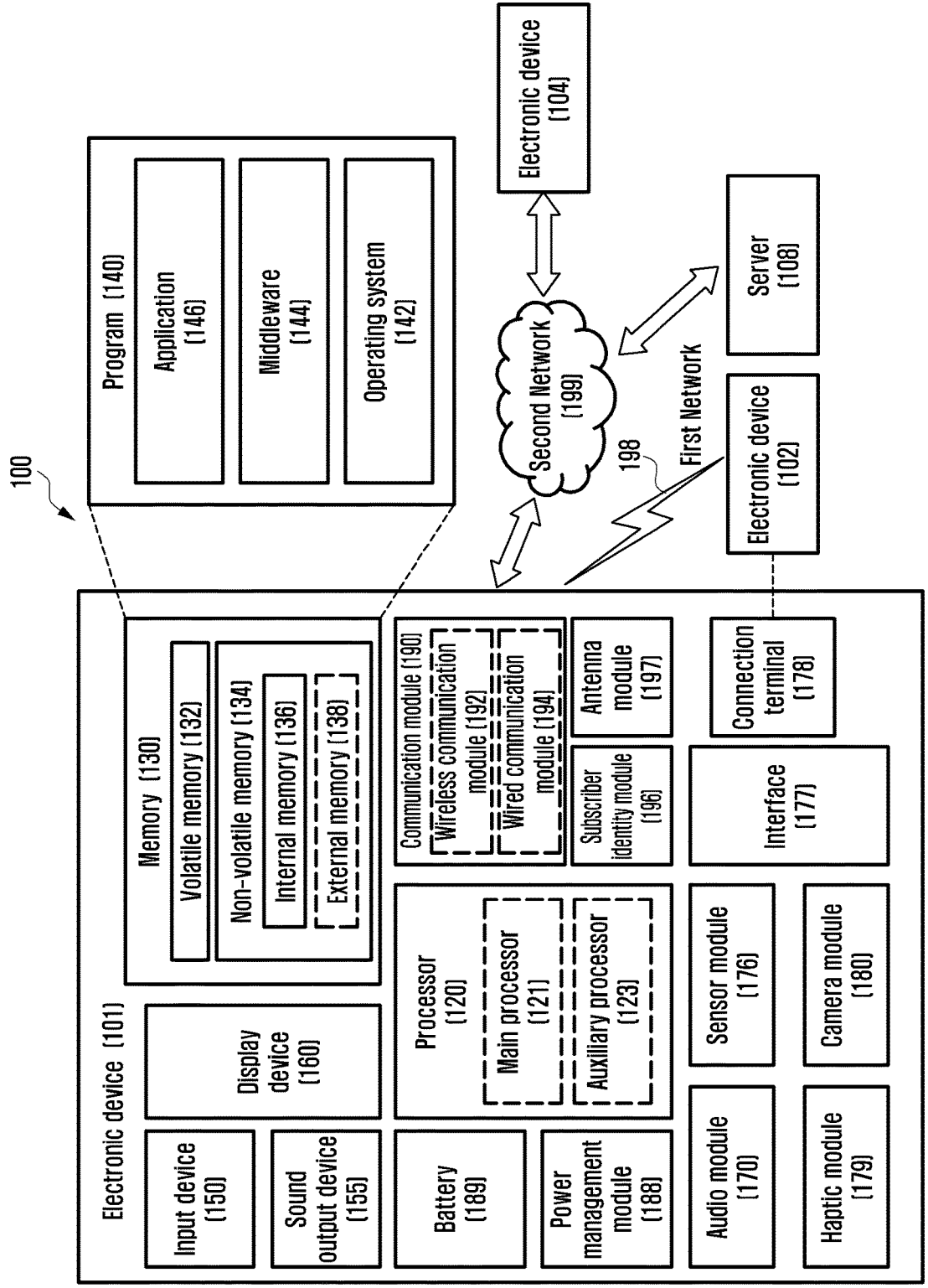
FIG. 1 is a block diagram of an electronic device according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
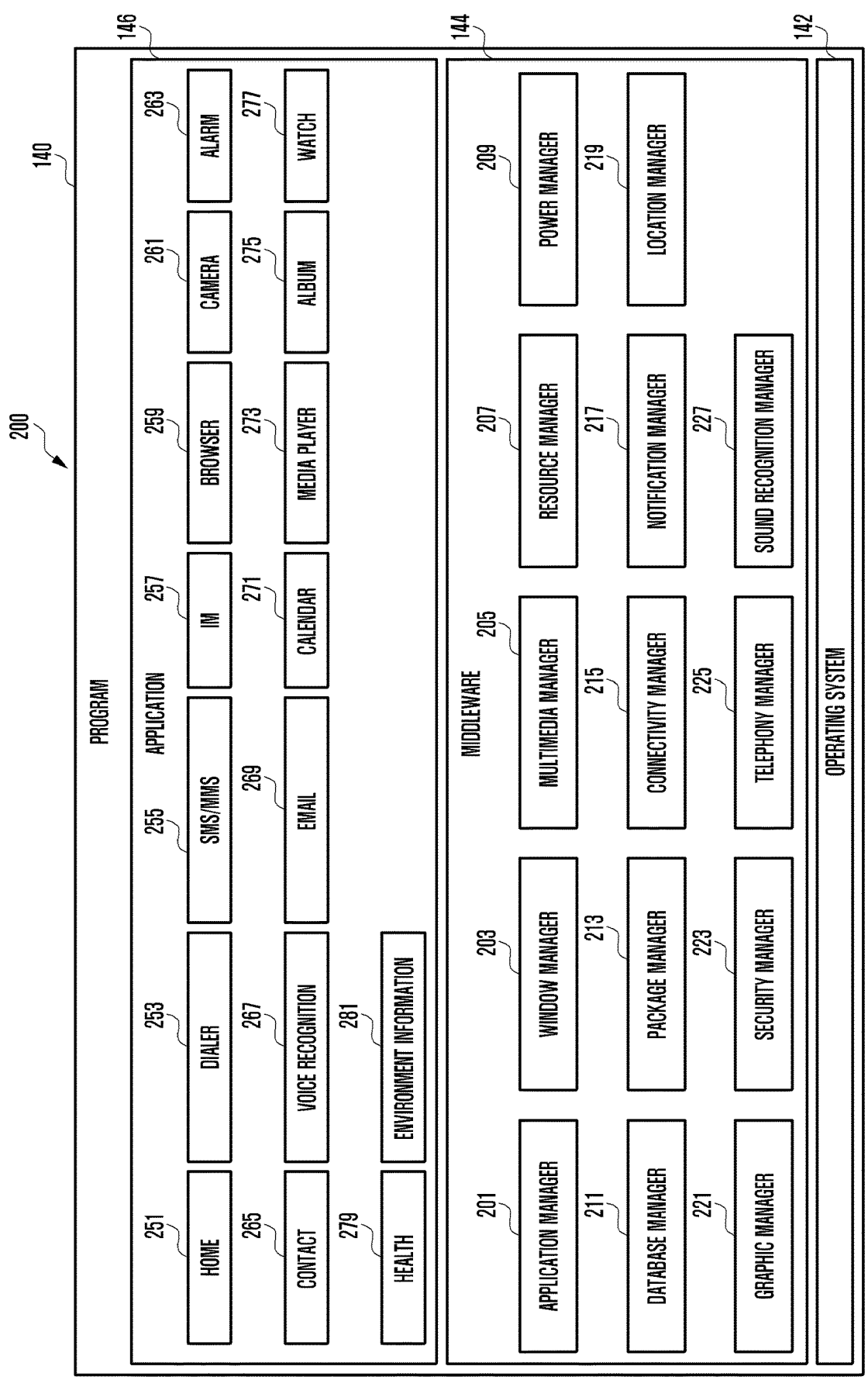
FIG. 2 is a block diagram of a program according to an embodiment of the disclosure.

FIG. 2 is a block diagram illustrating the program according to an embodiment of the disclosure.

Referring to FIG. 2, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
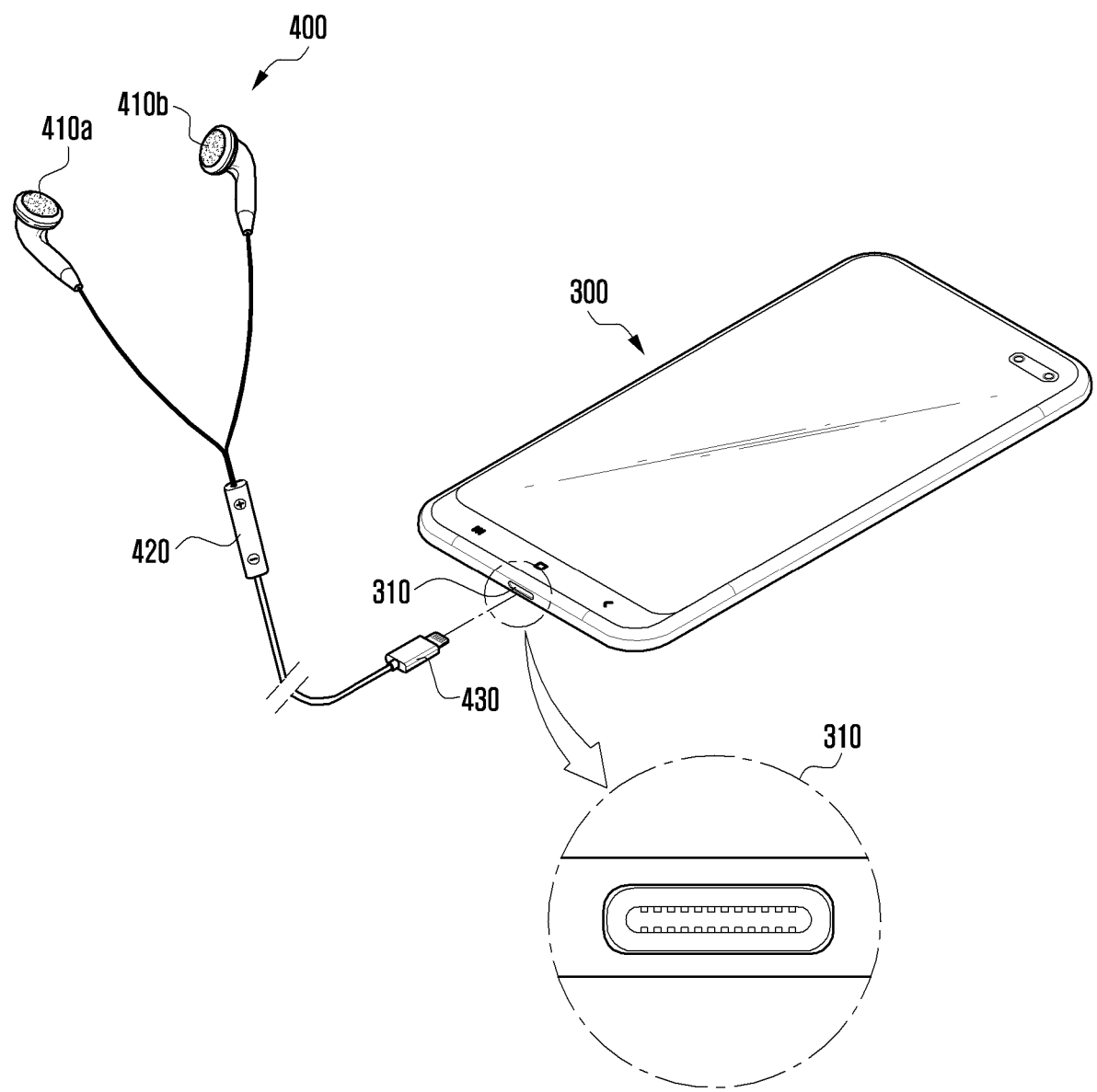
FIG. 3 is a view illustrating an electronic device and an external electronic device in a folded state according to an embodiment of the disclosure.

FIG. 3 is a view illustrating an electronic device and an external electronic device according to an embodiment of the disclosure.

Referring to FIG. 3, an electronic device 300 (e.g., an electronic device 101 in FIG. 1) may be implemented as a portable electronic device such as a smart phone or a tablet PC, but is not limited thereto. An electronic device may correspond to the electronic device 300 according to this disclosure as long as the electronic device includes a connector (e.g., a connector 310), to which an external electronic device is capable of being connected, and is capable of transmitting/receiving data (e.g., multimedia data such as audio data or other control instructions) to/from an external electronic device connected thereto via the connector.

According to various embodiments, the electronic device 300 may include an opening formed in one surface of a housing and a hole communicating with the opening, and a connector 310 may be disposed inside the hole.

An opening and a hole may be provided in the lower surface of the housing of the electronic device 300, and the connector 310 may be disposed therein. However, the disposed position of the connector 310 is not limited thereto, and the connector 310 may be disposed in another surface of the housing of the electronic device 300.

According to various embodiments, an external electronic device 400 may output audio stored in the electronic device 300 or a sound corresponding to a radio signal received by the external electronic device 400. The external electronic device 400 may include speakers 410-a and 410-b configured to output audio stored in the electronic device 300, a controller 420 having a circuit configured to control the output of audio, and a connector 430. Details of the external electronic device 400 will be described later with reference to FIG. 7.

According to various embodiments, the connector 310 may be a connector based on a serial universal bus (USB) standard, and more specifically, may be a connector of the USB type C Standard. However, various embodiments are not limited to the USB type C, and various standard wired interfaces, such as high-definition multimedia interface (HDMI), recommended standard 232 (RS-232), power line communication, and plain-old-telephone service (POTS), or a non-standard wired interface may be applied thereto. Furthermore, as long as an interface is capable of transmitting data (e.g., data transmitted from CC1 and CC2 pins included in the type C standard) available for automatically detecting whether some devices are connected between a source (a device that provides power) and a sink (a device that is supplied with power) or between a downstream-facing port (DFP) (a device that provides data) and an upstream-facing port (UFP) (a device that receives data), the interface corresponds to an interface to which various embodiments are applicable.

Figure 4A:
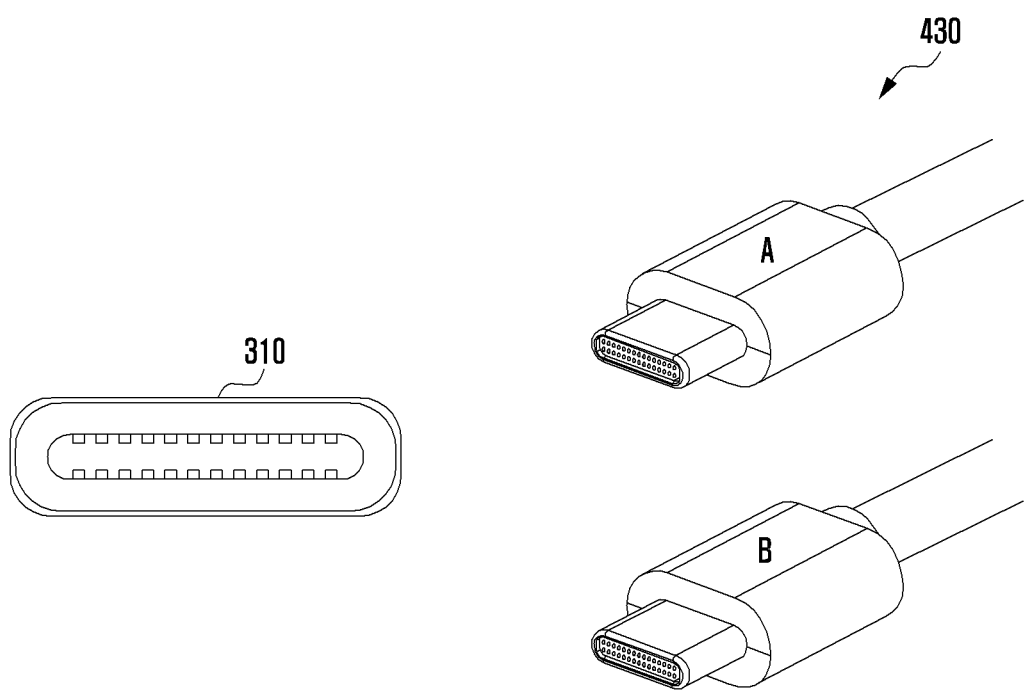
FIG. 4A is a view illustrating a pin structure of a connector of an electronic device according to an embodiment of the disclosure.

FIG. 4A is a view illustrating a pin structure of a connector of an electronic device according to an embodiment of the disclosure.

Figure 4B:
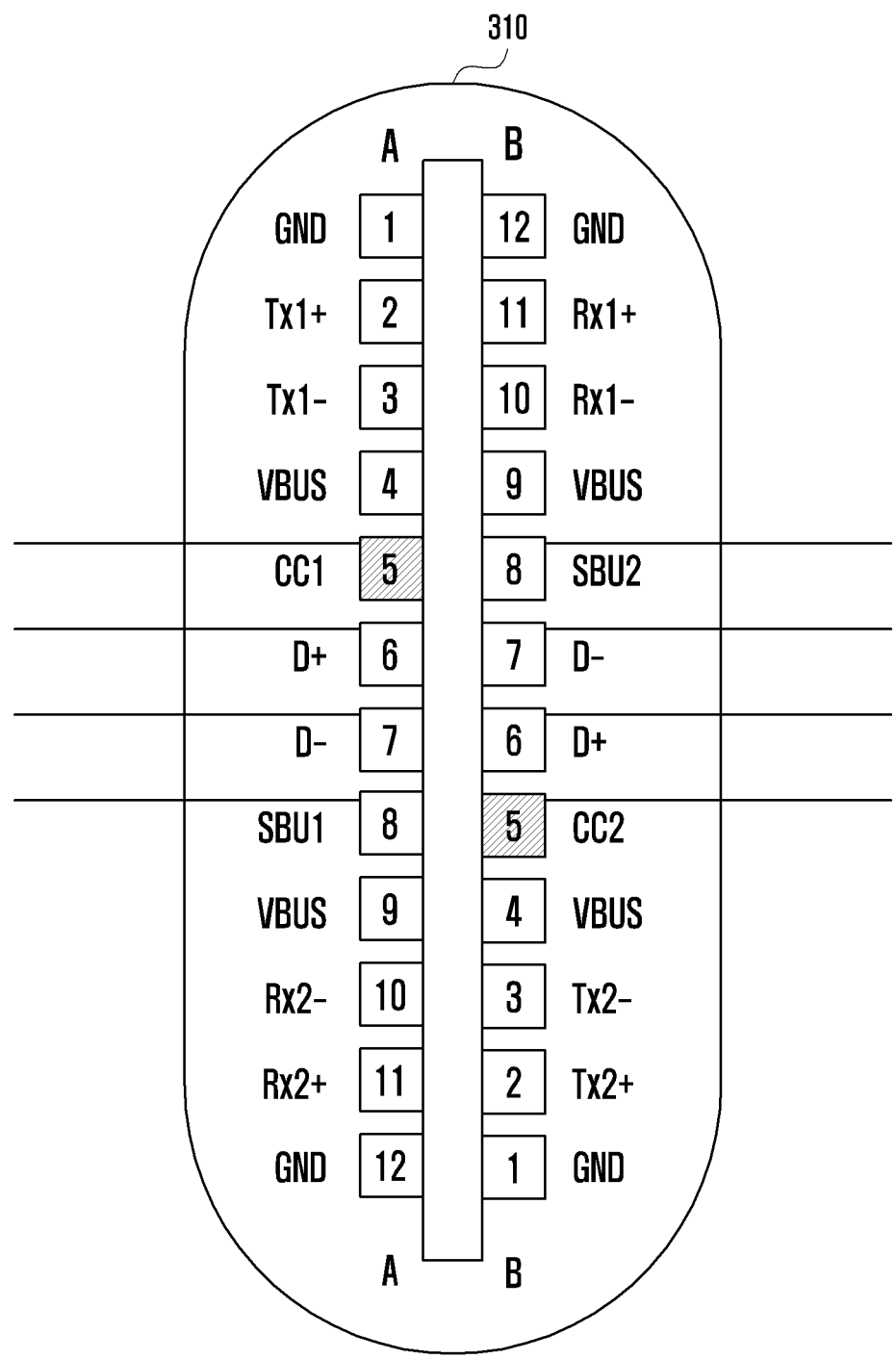
FIG. 4B is a view illustrating a pin structure of a connector of an electronic device according to an embodiment of the disclosure.

FIG. 4B is a view illustrating a pin structure of a connector of an electronic device according to an embodiment of the disclosure.

According to various embodiments, a connector 430 of an external electronic device 400 may be inserted into a connector 310 of an electronic device (e.g., the electronic device 101 in FIG. 1). The connector 430 of the external electronic device 400 may be accommodated through a hole to be in physical contact with the connector 310 of the electronic device 300, and may be electrically connected to the connector 310 due to the physical contact.

According to various embodiments, the structures of the connector 310 and the hole of the electronic device 300 may be reversible structures. In the connector 310, the portion in a first direction perpendicular to the direction in which the external electronic device is inserted (for example, from the bottom to the top of the electronic device 300) and the portion in a second direction opposite the first direction may be symmetrical with each other.

Referring to FIG. 4A, one surface (e.g., surface A) of the connector 430 of the external electronic device 400 may be inserted into the connector 310 of the electronic device 300 in a direction parallel to the front surface (e.g., the surface on which a display is located) of the electronic device 300. Similarly, another surface (e.g., surface B) of the connector 430 of the external electronic device 400 may be inserted in a direction parallel to the front surface of the electronic device 300.

According to various embodiments, the connector 310 of the electronic device 300 may include a plurality of terminals, and when the connector 430 of the external electronic device 400 is inserted in different orientations, respective terminals of the external electronic device electrically connected to respective terminals of the connector 310 of the electronic device 300 may be different from each other.

Referring to FIG. 4B, the connector of an electronic device (e.g., the electronic device 300) may comply with the USB type C Standard. FIG. 4B illustrates a plurality of terminals that may be provided in the connector of an electronic device that complies with the USB type C Standard. The connector of the USB type C Standard may have 12 terminals in each of line A of the left side and line B of the right side, and line A and line B may be symmetrical with each other.

According to various embodiments, the electronic device 300 may transmit data signals through A6 terminal/B6 terminal and A7 terminal/B7 terminal. The electronic device 300 (or the external electronic device 400) may transmit data to the external electronic device 400 (or the electronic device 300) through A6 terminal/B6 terminal D+.

The role of each terminal in various operation modes is defined by the USB Type-C Standard, and thus a description of the role of each terminal will be omitted.

According to various embodiments, when the electronic device 300 and the external electronic device 400 are connected to each other, electrical signals (e.g., digital IDs or resistance IDs) are exchanged through the CC1 and CC2 terminals. Accordingly, the electronic device and the external device may detect the type of the other device connected thereto. In addition, depending on the result of detecting the connected device, the electronic device may operate in a downstream-facing port (DFP) mode or an upstream-facing port (UFP) mode. The DFP mode may be a mode for providing data, and the UFP mode may be a mode for receiving data.

An electronic device according to various embodiments may transmit/receive data through an external electronic device connected via a USB type C connector or via a CC1 or CC2 terminal (hereinafter, collectively referred to as CC pin(s)). The CC pin may be used to automatically detect which device is connected between a source (a device that supplies power) and a sink (a device that is supplied with power) or a DFP (a device that provides data) and a UFP (a device that receives data).

According to various embodiments, the electronic device 300 should include a radio module, which is a separate module, in order to receive a radio broadcast (e.g., a frequency-modulation (FM) radio broadcast using a signal in a frequency band of 87.5 MHz to 108.0 MHz or an amplitude-modulation (AM) radio broadcast using a signal in a frequency band of 535 kHz to 1605 kHz). When the electronic device 300 includes the radio module, the external electronic device 400 connected to the electronic device 300 may serve as an antenna for receiving a radio signal. When the electronic device 300 and the external electronic device 400 are connected to each other via a USB type C connector, the external electronic device 400 may connect any one ground terminal among the terminals defined in the C connector to an inductor in order to serve as an antenna. Among the terminals illustrated in FIG. 4B, when ground terminals A12 and B12 are connected to an inductor, the intensity of current flowing through the ground terminals exceeds 1.25 A, which may cause a problem in that the intensity of the current exceeds the maximum current defined in the USB type C standard. Among the terminals illustrated in FIG. 4B, when the SBU pins A8 and B8 are connected to an inductor, a problem occurs in that the radio reception performance is degraded (e.g., degraded by 15 dB or more) due to noise between data related to audio transmitted between the external electronic device 400 and the electronic device 300 and a received radio signal.

Hereinafter, a specific embodiment for improving the radio signal reception performance between the electronic device 300 and an external electronic device 400 connected via a USB type C connector will be described.

Figure 5:
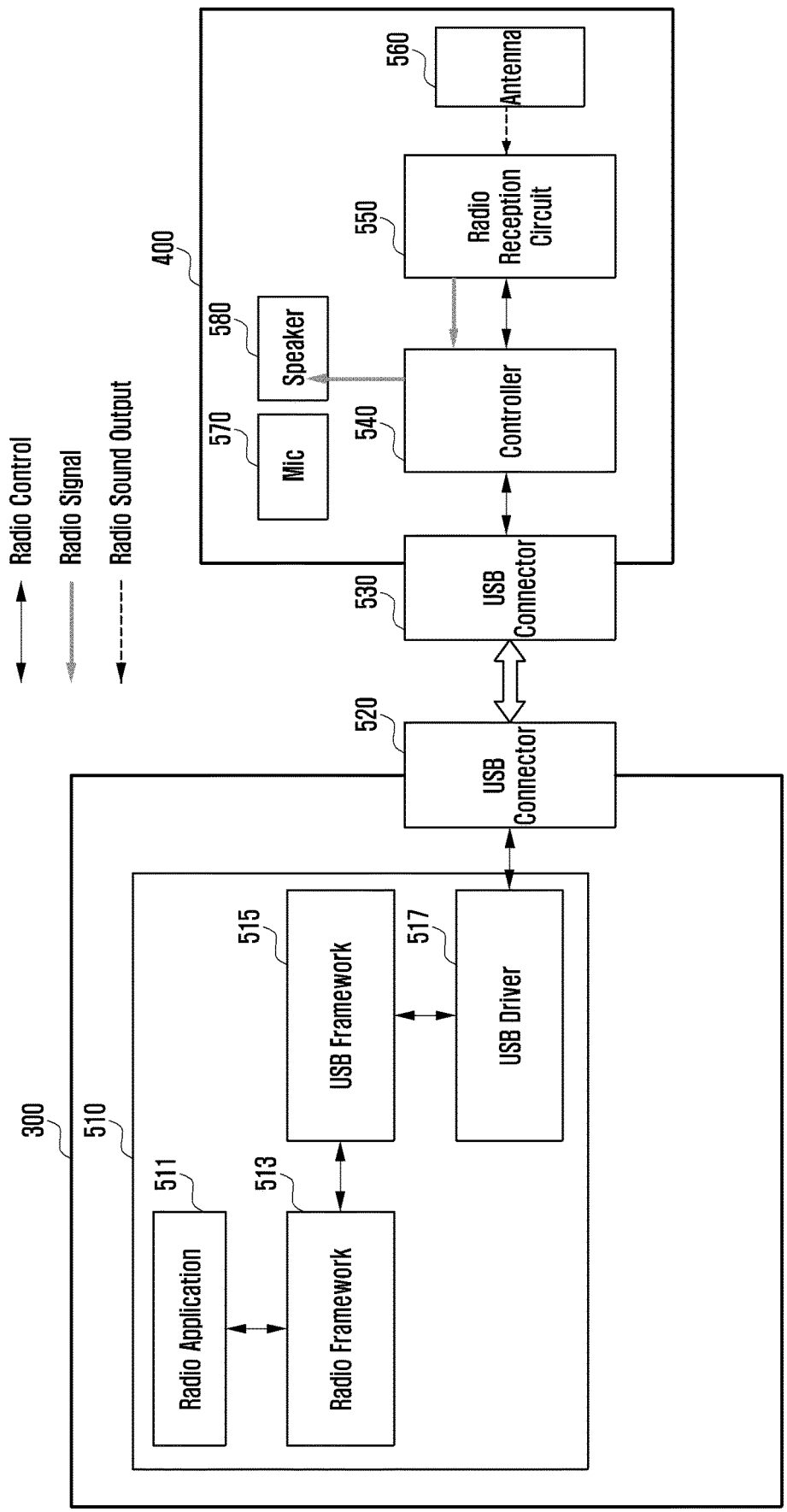
FIG. 5 is a block diagram of an electronic device and an external electronic device according to an embodiment of the disclosure.

FIG. 5 is a block diagram of an electronic device and an external electronic device according to an embodiment of the disclosure.

Referring to FIG. 5, an electronic device (e.g., the electronic device 300 in FIG. 3) according to various embodiments may include a processor 510 and a USB connector 520. An external electronic device (e.g., the external electronic device 400 in FIG. 3) may include a USB connector 530, a controller 540, a radio reception circuit 550, an antenna 560, a microphone 570, and a speaker 580.

According to various embodiments, the electronic device 300 may be electrically connected to the external electronic device 400 via various input/output interfaces (e.g., a PCI express (PCIE) interface, a lightning interface, or a USB interface). In FIG. 5, it is assumed that the electronic device 300 is connected to the external electronic device 400 via a USB interface. However, various embodiments are not limited to the USB interface, and various input/output interfaces may also be applicable thereto. When the components illustrated in FIG. 5 are applied to an input/output interface other than the USB, the components may be replaced by components that perform the same function among the components supported by the applied interface.

The electronic device 300 may be electrically connected to the external electronic device 400 via a USB connector 520 (e.g., the connector 310 in FIG. 3). The USB connector 520 may be implemented in the form of a USB type C connector, but may be implemented in various forms other than Type C.

According to various embodiments, for the radio broadcast reception of the electronic device 300, a controller 540 configured to process a radio signal may be implemented in the external electronic device 400 rather than in the electronic device 300. In a comparative example, the controller 540 configured to process a radio signal is implemented in the electronic device 300. As described above, when a radio signal received by the external electronic device 400 is transmitted to the electronic device 300 via the USB connector 520, a phenomenon in which the radio signal is degraded may occur. According to various embodiments, the controller 540 configured to process a radio signal is implemented in the external electronic device 400, whereby it is possible to prevent degradation of the radio signal reception performance obtained by the USB connector 520. Hereinafter, assuming that the controller 540 configured to process a radio signal is implemented in the external electronic device 400, the components of the electronic device 300 and the external electronic device 400 will be described.

According to various embodiments, the processor 510 may detect that the external electronic device 400 is connected to the USB connector 520. As the external electronic device 400 is fastened to the USB connector 520, a USB driver 517 may check the magnitude of the resistance detected by a CC pin and may determine the type of the external electronic device 400 (e.g., a headset) based on the magnitude of the resistance (e.g., 5.2 kΩ). The processor 510 may supply power to the external electronic device 400 to operate the same via a port (e.g., a VBUS port) configured to supply power to the external electronic device 400. The above operation may be performed by the USB driver 517 implemented in the kernel region of the processor 510.

According to various embodiments, when the external electronic device 400 is connected to the USB connector 520, the processor 510 may perform a series of preparation operations (e.g., enumeration) for data transmission between the electronic device 300 and the external electronic device 400. The processor 510 may receive information of the external electronic device 400 while performing a series of preparation procedures for data transmission between the electronic device 300 and the external electronic device 400. The information of the external electronic device 400 may include device descriptor information including a vendor identification (VID) indicating information about the manufacturer of the external electronic device 400 or a product identification (PID) indicating the product. The above operation may be performed by the USB driver 517 implemented in the kernel region of the processor 510.

According to various embodiments, the processor 510 may determine whether the external electronic device 400 is capable of processing a radio signal based on the information of the external electronic device. When the external electronic device 400 is capable of processing a radio signal, it may mean that the external device includes a radio reception circuit configured to receive a radio signal and convert the radio signal into a digital signal and a controller 540 configured to generate a sound to output the converted signal to an earphone. The processor 510 may determine whether the external electronic device 400 is capable of processing a radio signal based on a list of external electronic devices capable of receiving and processing a radio signal stored in a memory (e.g., the memory 130 in FIG. 1) and information on the external electronic device 400. The above operation may be performed by the USB driver 517 implemented in a framework region of the processor 510.

According to various embodiments, the processor 510 may activate a radio framework 513 configured to control the radio reception function of the external electronic device in response to determining that the external electronic device 400 is capable of processing a radio signal. The USB framework 515 may broadcast a signal indicating that the external electronic device 400 capable of processing a radio signal is connected. In response to reception of the broadcast signal, the radio framework 513 may activate a function for controlling the radio reception function.

According to various embodiments, the processor 510 may control the radio framework 513 to generate a signal for controlling the controller 540 and the radio reception circuit 550 of the external electronic device 400 based on an instruction transmitted by a radio application 511. The radio application 511 may provide the radio framework 513 with information on various settings including volume setting of a sound output from the external electronic device 400 and channel setting of a radio broadcast based on user input or preset setting information.

According to various embodiments, the radio framework 513 may generate a control signal for controlling the external electronic device 400 based on the setting information provided by the radio application 511, and may transmit the control signal to the external electronic device 400. The radio framework 513 may transmit the control signal to the USB framework 515 in order to transmit the control signal to the external electronic device 400. The USB framework 515 may transmit the control signal to the external electronic device 400 using the USB driver 517.

According to various embodiments, the processor 510 may control the function of the external electronic device 400 based on the control signal. Based on various control signals, the processor 510 may control the functions of the external electronic device 400 including activation or deactivation of the radio broadcast reception function of the external electronic device 400, adjustment of the volume of a sound corresponding to a radio broadcast output from the external electronic device 400, and changing of the channel of a radio broadcast received by the external electronic device 400.

According to various embodiments, the radio application 511, the radio framework 513, the USB framework 515, and the USB driver 517 may be implemented in the processor 510. Specific operations of the components will be described later with reference to FIG. 6.

Referring to FIG. 5, the external electronic device 400 may include a USB connector 530, a controller 540, a radio reception circuit 550, an antenna 560, a microphone 570, and a speaker 580.

According to various embodiments, the external electronic device 400 may be electrically connected to the electronic device 300 via a USB connector 530 (e.g., the connector 430 in FIG. 3). The USB connector 530 may be implemented in the form of a USB type C connector, but may be implemented in various forms other than type C.

According to various embodiments, the radio reception circuit 550 may receive a radio signal corresponding to a radio broadcast through the antenna 560. The signal received by the radio reception circuit 550 may be a signal implemented as an analog. The radio reception circuit 550 may adjust a resonance frequency under the control of the controller 540 operating in response to a control signal transmitted from the electronic device 300. The radio reception circuit 550 may receive signals corresponding to various radio channels by adjusting the resonance frequency.

According to various embodiments, the radio reception circuit 550 may perform processing on the received radio signals and may transmit the processed signals to the controller 540. The radio reception circuit 550 may include an analog-to-digital converter (ADC) that converts a radio signal implemented in an analog form into a digital form capable of being processed by the controller 540. The radio reception circuit 550 may transmit the signal converted into the digital form to the controller 540.

According to various embodiments, the controller 540 may perform various processes on the signal transmitted by the radio reception circuit 550. The controller 540 may include an audio codec that processes a signal transmitted by the radio reception circuit 550. The audio codec may be implemented in a hardware configuration included in the controller 540. The controller 540 may perform various processes based on a control signal transmitted by the electronic device 300, including amplifying a signal transmitted by the radio reception circuit 550 and improving the quality of a sound corresponding to the radio signal.

According to various embodiments, the controller 540 may control the speaker 580 to output a sound corresponding to the processed signal. The controller 540 may include a digital-to-analog converter (DAC) that converts the processed signal into an analog signal. The controller 540 may generate a sound corresponding to the signal processed using the DAC, and may control the speaker 580 to output the sound.

According to various embodiments, the external electronic device 400 may perform an operation of outputting audio stored in the electronic device 300 separately from outputting a sound corresponding to a radio signal. The external electronic device 400 may perform the operation of outputting the audio stored in the electronic device 300 simultaneously with outputting the sound output corresponding to the radio signal. To this end, the controller 540 may receive data related to audio transmitted by the electronic device 300, and may mix data related to the audio and sound corresponding to the radio signal. The controller 540 may control the speaker 580 to output the mixed sound.

According to various embodiments, the electronic device 300 may transmit, to the controller 540, a first control signal related to an operation of outputting the audio stored in the electronic device 300 and a second control signal related to an operation of outputting the sound corresponding to the radio signal. The controller 540 may control the output of audio and the output of the sound corresponding to the radio signal based on the first control signal and the second control signal. Endpoints (or pipes) of the first control signal and the second control signal may be different from each other. The endpoints (or pipes) may be a plurality of data transmission paths logically implemented between the electronic device 300 and the external electronic device 400.

According to various embodiments, the microphone 570 may receive sound from the vicinity of the electronic device 300 or the external electronic device 400 and may convert the received sound into a digital form.

Figure 6:
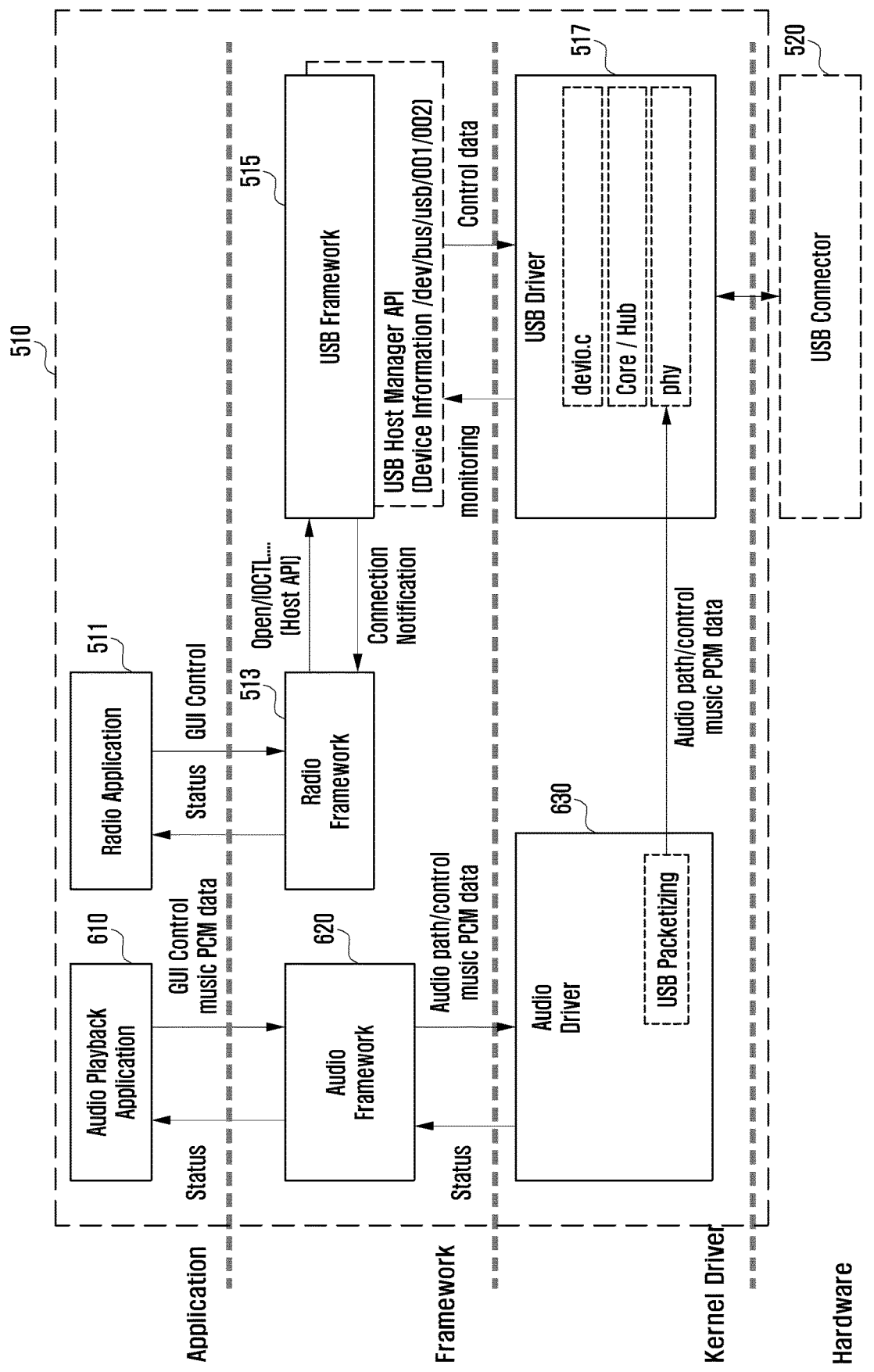
FIG. 6 is a view illustrating software layers of an electronic device according to an embodiment of the disclosure.

FIG. 6 is a view illustrating software layers of an electronic device according to an embodiment of the disclosure.

Referring to FIG. 6, a radio application 511, a radio framework 513, a USB framework 515, a USB driver 517, an audio playback application 610, an audio framework 620, and an audio driver 630 may be implemented in a processor (e.g., the processor 510 in FIG. 5).

According to various embodiments, the radio application 511 may mean an application for controlling functions related to reception of a radio broadcast (a function of activating or deactivating a radio reception function, a function of outputting a sound corresponding to a radio signal, and a function of changing or setting a radio channel). The radio application 511 may provide a user interface for allowing a user to control a function related to reception of a radio broadcast.

According to various embodiments, the audio playback application 610 may mean an application for controlling functions related to audio playback (activation or deactivation of an audio output function, volume adjustment during audio playback, and an audio equalizer function). The audio playback application 610 may provide a user interface for allowing the user to control the functions related to audio playback.

According to various embodiments, the radio framework 513 may generate a control signal for controlling the external electronic device 400 based on the setting information provided by the radio application 511, and may transmit the control signal to the external electronic device 400. The radio framework 513 may transmit the control signal to the USB framework 515 in order to transmit the control signal to the external electronic device 400. The radio framework 513 may receive state information of the external electronic device 400, which is transmitted by the USB framework 515, and may transmit the state information to the radio application 511.

According to various embodiments, the USB framework 515 is a component that allows an application to use a function capable of being provided by various external electronic devices connected thereto via the USB connector 520, and may provide a function capable of being provided by the external electronic devices to the application. The USB framework 515 may transmit a control signal transmitted from the application layer to the USB driver 517. The USB framework 515 may receive a control signal transmitted by the radio framework 513, and may transmit the control signal to the USB driver 517. The USB framework 515 may receive state information of the external electronic device 400, which is transmitted by the USB driver 517, and may transmit the state information to the radio framework 513.

According to various embodiments, the USB framework 515 may use instructions that use a USB HOST application programming interface (API) when transmitting/receiving data to/from the radio framework 513. The USB framework 515 may provide information related to the USB HOST API such that the radio framework 513 is able to use the USB HOST API. The USB HOST API may be a set of APIs capable of controlling the external electronic device 400 connected to the USB connector 520 without a USB kernel class driver. The instructions supported by the USB HOST API are listed in Table 1.

TABLE 1

| Class | Explanation |
|---|---|
| UsbManager | This instruction is used to enumerate and find connected USB devices and to obtain an object for communication. |
| UsbDevice | This instruction represents a connected USB device and contains information indicating how to access distinguished information, an interface, and an endpoint. |
| UsbInterface | This instruction defines an interface of an external electronic device in which a set of functions of an electronic device is defined. The electronic device may have at least one interface for communication. |
| UsbEndpoint | This instruction represents an endpoint of an interface, and corresponds to a communication channel for the interface. An interface may have at least one endpoint, and usually has input and output endpoints for bidirectional communication with an ordinary device. |
| UsbDeviceConnection | This instruction is an instruction for transmitting data through endpoints. The above-mentioned class supports a function capable of transmitting data synchronously or asynchronously. |
| UsbRequest | This instruction represents a request for asynchronous communication with a device via UsbDeviceConnection. |
| UsbConstants | This instruction defines associated constants defined in linux/usb/ch9.h of the Linux kernel. |

According to various embodiments, the audio framework 620 may provide functions capable of being supported by a component of the electronic device 300 (e.g., a sound output device 155 in FIG. 1) in which an application (e.g., the audio playback application 610) is capable of outputting audio, or the external electronic device 400. The audio framework 620 may generate a control signal for controlling the sound output device 155 or the external electronic device 400 based on setting information provided by the audio playback application 610, and may transmit the control signal to the audio driver 630.

According to various embodiments, the USB driver 517 may be a component that serves to transmit a control signal to an external electronic device connected to the USB connector 520 or to transmit information transmitted by an external electronic device to the USB framework 515. The USB driver 517 may receive state information from the external electronic device 400 connected to the USB connector 520 and convert the state information into a form capable of being used by the USB framework 515.

According to various embodiments, the audio driver 630 may transmit a control signal transmitted by the audio framework 620, to the sound output device 155. The audio driver 630 may cause the external electronic device 400 connected to the USB connector 520 to output audio by transmitting the control signal transmitted by the audio framework 620, to the USB driver 517.

Hereinafter, a specific operation of receiving a radio broadcast by the electronic device 300, which uses the above-described components, using the external electronic device 400 will be described.

According to various embodiments, the USB driver 517 may detect that the external electronic device 400 is connected to the USB connector 520. When the external electronic device 400 is fastened to the USB connector 520, a USB driver 517 may check the magnitude of the resistance detected by a CC pin and may determine the type of the external electronic device 400 (e.g., a headset) based on the magnitude of the resistance (e.g., 5.2 kΩ). The USB driver 517 may supply power to the external electronic device 400 to operate the same via a port (e.g., a VBUS port) configured to supply power to the external electronic device 400.

According to various embodiments, when the external electronic device 400 is connected to the USB connector 520, the USB driver 517 may perform a series of preparation operations (e.g., enumeration) for data transmission between the electronic device 300 and the external electronic device 400. The USB driver 517 may receive information of the external electronic device 400 while performing a series of preparation procedures for data transmission between the electronic device 300 and the external electronic device 400. The information of the external electronic device 400 may include device descriptor information including a vendor identification (VID) indicating information about the manufacturer of the external electronic device 400 or a product identification (PID) indicating the product.

According to various embodiments, the USB driver 517 may transmit a signal indicating that the external electronic device 400 capable of receiving and processing radio signals is connected to the USB framework 515. The USB framework 515 may broadcast a signal indicating that the external electronic device 400 capable of processing a radio signal is connected. In response to reception of the broadcast signal, the radio framework 513 may activate a function for controlling the radio reception function.

According to various embodiments, the radio application 511 may receive user input on a user interface that allows a user to control a function related to reception of a radio broadcast, and may transmit setting information corresponding to the user input to the radio framework 513.

According to various embodiments, the radio framework 513 may generate a control signal for controlling the external electronic device 400 based on the setting information provided by the radio application 511, and may transmit the control signal to the USB framework 515. The radio framework 513 may generate a control signal using the USB HOST API and configuration information provided by the USB framework 515.

According to various embodiments, the USB framework 515 may transmit, to the USB driver 517, information including the control signal received from the radio framework 513 and parameters indicating the external electronic device 400 to which the control signal is to be transmitted.

According to various embodiments, the USB driver 517 may transmit the control signal to the external electronic device 400 via the USB connector 520.

According to various embodiments, the control signals generated by the radio framework 513 may include a third control signal for controlling an operation related to outputting a sound corresponding to a radio signal and a fourth control signal for controlling a radio reception circuit (e.g., the radio reception circuit 550 in FIG. 5) of the external electronic device 400. Endpoints (or pipes) of the third control signal and the fourth control signal may be different from each other. The endpoints (or pipes) may be a plurality of data transmission paths logically implemented between the electronic device 300 and the external electronic device 400.

According to various embodiments, the controller 540 may receive a control signal and may perform various operations based on the control signal. The controller 540 may identify a received control signal and may identify an endpoint corresponding to the control signal. The controller 540 may allow the external electronic device 400 to perform a specific operation by transmitting a control signal to a component corresponding to the identified endpoint. For example, in response to reception of the third control signal for controlling the operation related to outputting a sound corresponding to a radio signal, the controller 540 may perform an operation corresponding to the third control signal (sound volume adjustment). As another example, in response to reception of the fourth control signal for controlling the radio reception circuit 550, the controller 540 may transmit a control signal to the radio reception circuit 550. The radio reception circuit 550 may perform a specific operation (e.g., resonant frequency adjustment, activation or deactivation of a radio reception function) corresponding to the control signal.

According to various embodiments, the processor 510 may control the external electronic device 400 to output audio stored in the electronic device 300 independently of radio broadcast reception.

According to various embodiments, the audio playback application 610 may receive user input on a user interface, which allows a user to control functions related to audio playback (activation or deactivation of an audio output function, volume adjustment during audio playback, and an audio equalizer function), and may transmit setting information corresponding to the user input to the audio framework 620.

According to various embodiments, the audio framework 620 may generate a control signal for controlling the external electronic device 400 based on the setting information transmitted by the audio playback application 610, and may transmit data related to the audio (e.g., pulse code modulation (PCM) data corresponding to audio and an audio output path) and the control signal to the audio driver 630.

According to various embodiments, the audio driver 630 may cause the external electronic device 400 connected to the USB connector 520 to output audio by transmitting the control signal transmitted by the audio framework 620, to the USB driver 517.

According to various embodiments, the electronic device 300 may transmit data related to audio to the controller 540. The controller 540 may receive data related to audio and may output the data related to audio through a speaker (e.g., the speaker 580 in FIG. 5). An endpoint through which data related to audio is transmitted may be different from an endpoint of a signal for controlling the radio reception circuit 550 of the external electronic device 400. The endpoint may mean a logical path through which data is transmitted between the electronic device 300 and the external electronic device 400.

According to various embodiments, the radio framework 513 may use the USB HOST API provided by the USB framework 515. The USB HOST API is an API supported by various operating systems. The electronic device 300 according to various embodiments is capable of improving compatibility for allowing various electronic devices to receive radio broadcasts due to the addition of an external electronic device having a radio reception circuit and a radio framework 513.

An electronic device according to various embodiments may include: a USB connector connectable to an external electronic device including a radio reception circuit configured to receive a radio signal and to convert the received radio signal into a digital signal, and a signal processing circuit configured to generate a sound corresponding to the digital signal based on a control signal transmitted by the electronic device; and a processor. The processor may be configured to: receive information of the external electronic device in response to detecting that the external electronic device is connected to the USB connector; determine whether the external electronic device is capable of processing the radio signal based on the information of the external electronic device; activate a radio framework configured to control a radio reception function of the external electronic device in response to identifying that the external electronic device is capable of processing the radio signal; and control the external electronic device based on the operation of the USB framework, which receives the control signal generated by the radio framework.

In the electronic device according to various embodiments, the processor may be configured to: control the radio framework such that the radio framework generates a control signal for controlling the radio signal reception function of the external electronic device; control the radio framework such that the radio framework transmits the control signal to the USB framework; control the USB framework such that the USB framework transmits the control signal to a USB driver configured to transmit data to the external electronic device connected to the USB connector; and control the USB driver such that the USB driver transmits the control signal to the external electronic device using a preset endpoint.

In the electronic device according to various embodiments, the radio framework may be configured to transmit the control signal to the USB framework based on an application programming interface (API) provided by the USB framework.

In the electronic device according to various embodiments, the processor may be configured to transmit a first control signal for controlling a sound output operation corresponding to a radio signal of the external electronic device or a second control signal for controlling a radio signal reception operation of the external electronic device to the external electronic device.

In the electronic device according to various embodiments, an endpoint of the first control signal and an endpoint of the second signal may be different from each other.

In the electronic device according to various embodiments, the processor may be configured to: control the audio framework such that, in response to receiving a request for outputting audio stored in the electronic device, the audio framework configured to control output of the audio transmits data related to the audio to an audio driver connected to the USB driver; control the audio driver such that the audio driver transmits data related to the audio to the USB driver; and control the USB driver such that the USB driver transmits the data related to the audio to the external electronic device using a preset endpoint.

In the electronic device according to various embodiments, an endpoint of a control signal for controlling the radio reception circuit and the endpoint of the data related to the audio may be different from each other.

In the electronic device according to various embodiments, the processor may be configured to determine whether the external electronic device is capable of processing the radio signal based on a vendor identification (VID) or a product identification (PID) included in data transmitted by the external electronic device when the external electronic device is connected to the USB connector.

In the electronic device according to various embodiments, the USB connector may be implemented in the form of type C.

An electronic device according to various embodiments may include: a radio reception circuit configured to receive a radio signal; a processor; a speaker configured to output a sound corresponding to the radio signal; and a USB connector. The processor may be configured to: transmit information of the electronic device to the external electronic device in response to detection of a connection with an external electronic device through the USB connector; control the radio reception circuit based on a control signal transmitted by the external electronic device; and process a signal received by the radio reception signal and control the speaker such that the speaker outputs the sound using the processed signal.

In the electronic device according to various embodiments, the processor may be configured to: receive data related to audio transmitted by the external electronic device; mix the data related to the audio and the signal received by the radio reception circuit; and control the speaker such that the speaker outputs the mixed sound.

FIG. 7 is a flowchart illustrating operations of an electronic device operating method according to an embodiment of the disclosure.

Referring to FIG. 7 depicting a flowchart 700, in operation 710, a processor (e.g., the processor 510 in FIG. 5) may receive the information of an external electronic device (e.g., the external electronic device 400 in FIG. 5).

According to various embodiments, the processor 510 may receive information of the external electronic device 400 while performing a series of preparation procedures for data transmission between the electronic device 300 and the external electronic device 400. The information of the external electronic device 400 may include device descriptor information including a vendor identification (VID) indicating information about the manufacturer of the external electronic device 400 or a product identification (PID) indicating the product. The above operation may be performed by the USB driver 517 implemented in the kernel region of the processor 510.

According to various embodiments, in operation 720, the processor 510 may determine whether the external electronic device 400 is capable of processing a radio signal.

According to various embodiments, when the external electronic device 400 is capable of processing a radio signal, it may mean that the external electronic device 400 includes a radio reception circuit 550 configured to receive a radio signal and convert the radio signal into a digital signal and a controller 540 configured to generate a sound to output the converted signal to an earphone. The processor 510 may determine whether the external electronic device 400 is capable of processing a radio signal based on a list of external electronic devices capable of receiving and processing a radio signal stored in a memory (e.g., the memory 130 in FIG. 1) and information on the external electronic device 400. The above operation may be performed by the USB driver 517 implemented in a framework region of the processor 510.

According to various embodiments, in operation 730, in response to determining whether the external electronic device 400 is capable of processing a radio signal, the processor 510 may activate the radio framework (e.g., the radio framework 513 in FIG. 5).

According to various embodiments, the USB driver 517 may transmit a signal indicating that the external electronic device 400 capable of receiving and processing radio signals is connected to the USB framework 515. The USB framework 515 may broadcast a signal indicating that the external electronic device 400 capable of processing a radio signal is connected. In response to reception of the broadcast signal, the radio framework 513 may activate a function for controlling the radio reception function.

According to various embodiments, in operation 740, the processor 510 may control the external electronic device 400 based on a control signal generated by the radio framework 513.

According to various embodiments, the radio framework 513 may generate a control signal for controlling the external electronic device 400 based on the setting information provided by the radio application 511, and may transmit the control signal to the external electronic device 400. The radio framework 513 may transmit the control signal to the USB framework 515 in order to transmit the control signal to the external electronic device 400. The USB framework 515 may transmit the control signal to the external electronic device 400 using the USB driver 517.

An electronic device operating method according to various embodiments may include: an operation of receiving information of an external electronic device in response to detecting that the external electronic device is connected to a USB connector, wherein the external electronic device includes a radio reception circuit configured to receive a radio signal and to convert the received radio signal into a digital signal, and a signal processing circuit configured to generate a sound corresponding to the digital signal based on a control signal transmitted by the electronic device; an operation of determining whether the external electronic device is capable of processing the radio signal based on the information of the external electronic device; an operation of activating a radio framework configured to control a radio reception function of the external electronic device in response to identifying that the external electronic device is capable of processing the radio signal; and an operation of controlling the external electronic device based on the operation of the USB framework, which receives the control signal generated by the radio framework.

The electronic device operating method according to various embodiments may further include: an operation of generating, by the radio framework, a control signal for controlling the radio signal reception function of the external electronic device; an operation of transmitting by the radio framework, the control signal to the USB framework; an operation of transmitting, by the USB framework, the control signal to a USB driver configured to transmit data to the external electronic device connected to the USB connector; and an operation of transmitting, by the USB driver, the control signal to the external electronic device using a preset endpoint.

In the electronic device operating method according to various embodiments, the operation transmitting the control signal to the USB framework may include an operation of transmitting the control signal to the USB framework based on an application programming interface (API) provided by the USB framework.

The electronic device operating method according to various embodiments may further include an operation of transmitting, by the USB framework, a first control signal for controlling a sound output operation corresponding to a radio signal of the external electronic device or a second control signal for controlling a radio signal reception operation of the external electronic device to the external electronic device.

In the electronic device operating method, an endpoint of the first control signal and an endpoint of the second signal may be different from each other.

The electronic device operating method may further include: an operation of transmitting, in response to receiving a request for outputting audio stored in the electronic device, by the audio framework configured to control output of the audio, data related to the audio to an audio driver connected to the USB driver; an operation of transmitting, by the audio driver, the data related to the audio to the USB driver; and an operation of transmitting, by the USB driver, the data related to the audio to the external electronic device using a preset endpoint.

In the electronic device operating method, an endpoint of a control signal for controlling the radio reception circuit and the endpoint of the data related to the audio may be different from each other.

In the electronic device operating method according to various embodiments, the operation of determining whether the external electronic device is capable of processing the radio signal may include determining whether the external electronic device is capable of processing the radio signal based on a vendor identification (VID) or a product identification (PID) included in data transmitted by the external electronic device when the external electronic device is connected to the USB connector.

In the electronic device operating method, the USB connector may be implemented in the form of type C.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a universal serial bus (USB) connector connectable to an external electronic device including a radio reception circuit configured to receive a radio signal and to convert the received radio signal into a digital signal, and a signal processing circuit configured to generate a sound corresponding to the digital signal based on a control signal transmitted by the electronic device; and
a processor,
wherein the processor is configured to:
receive information of the external electronic device in response to detecting that the external electronic device is connected to the USB connector,
determine whether the external electronic device is capable of processing the radio signal based on the information of the external electronic device,
activate a radio framework configured to control a radio reception function of the external electronic device in response to identifying that the external electronic device is capable of processing the radio signal, and
control the external electronic device based on an operation of a USB framework, which receives the control signal generated by the radio framework.

2. The electronic device of claim 1, wherein the processor is further configured to:
control the radio framework such that the radio framework generates a control signal for controlling the radio reception function of the external electronic device,
control the radio framework such that the radio framework transmits the control signal to the USB framework,
control the USB framework such that the USB framework transmits the control signal to a USB driver configured to transmit data to the external electronic device connected to the USB connector, and
control the USB driver such that the USB driver transmits the control signal to the external electronic device using a preset endpoint.

3. The electronic device of claim 2, wherein the radio framework is configured to transmit the control signal to the USB framework based on an application programming interface (API) provided by the USB framework.

4. The electronic device of claim 1, wherein the processor is further configured to transmit a first control signal for controlling a sound output operation corresponding to a radio signal of the external electronic device or a second control signal for controlling a radio signal reception operation of the external electronic device to the external electronic device.

5. The electronic device of claim 4, wherein an endpoint of the first control signal and an endpoint of the second control signal are different from each other.

6. The electronic device of claim 1, wherein the processor is further configured to:
control an audio framework such that, in response to receiving a request for outputting audio stored in the electronic device, the audio framework configured to control output of the audio transmits data related to the audio to an audio driver connected to a USB driver,
control the audio driver such that the audio driver transmits data related to the audio to the USB driver, and
control the USB driver such that the USB driver transmits the data related to the audio to the external electronic device using a preset endpoint.

7. The electronic device of claim 6, wherein an endpoint of a control signal for controlling the radio reception circuit and the endpoint of the data related to the audio are different from each other.

8. The electronic device of claim 1, wherein the processor is further configured to determine whether the external electronic device is capable of processing the radio signal based on a vendor identification (VID) or a product identification (PID) included in data transmitted by the external electronic device when the external electronic device is connected to the USB connector.

9. The electronic device of claim 1, wherein the USB connector is implemented in a form of type C.

10. An electronic device comprising:
a radio reception circuit configured to receive a radio signal;
a processor;
a speaker configured to output a sound corresponding to the radio signal; and
a USB connector,
wherein the processor is configured to:
transmit information of the electronic device in response to detection of a connection with an external electronic device through the USB connector,
control the radio reception circuit based on a control signal transmitted by the external electronic device, and
process a signal received by the radio reception circuit and control the speaker such that the speaker outputs the sound using the processed signal, and wherein the processor is further configured to:
receive data related to audio transmitted by the external electronic device,
mix the data related to the audio and the signal received by the radio reception circuit, and
control the speaker such that the speaker outputs mixed sound.

11. A method of operating an electronic device, the method comprising:
receiving information of an external electronic device in response to detecting that the external electronic device is connected to a USB connector, wherein the external electronic device includes a radio reception circuit configured to receive a radio signal and to convert the received radio signal into a digital signal, and a signal processing circuit configured to generate a sound corresponding to the digital signal based on a control signal transmitted by the electronic device;
determining whether the external electronic device is capable of processing the radio signal based on the information of the external electronic device;
activating a radio framework configured to control a radio reception function of the external electronic device in response to identifying that the external electronic device is capable of processing the radio signal; and
controlling the external electronic device based on the operation of a USB framework, which receives the control signal generated by the radio framework.

12. The method of claim 11, further comprising:
generating, by the radio framework, a control signal for controlling the radio reception function of the external electronic device;
transmitting by the radio framework, the control signal to the USB framework;
transmitting, by the USB framework, the control signal to a USB driver configured to transmit data to the external electronic device connected to the USB connector; and
transmitting, by the USB driver, the control signal to the external electronic device using a preset endpoint.

13. The method of claim 12, wherein the transmitting of the control signal to the USB framework includes:
transmitting the control signal to the USB framework based on an application programming interface (API) provided by the USB framework.

14. The method of claim 11, further comprising:
transmitting, by the USB framework, a first control signal for controlling a sound output operation corresponding to a radio signal of the external electronic device or a second control signal for controlling a radio signal reception operation of the external electronic device to the external electronic device.

15. The method of claim 14, wherein an endpoint of the first control signal and an endpoint of the second control signal are different from each other.

16. The method of claim 11, further comprising:
transmitting, in response to reception of a request for outputting audio stored in the electronic device, by audio framework configured to control output of the audio, data related to the audio to an audio driver connected to the audio framework;
transmitting, by the audio driver, the data related to the audio to a USB driver; and
transmitting, by the USB driver, the data related to the audio to the external electronic device using a preset endpoint.

17. The method of claim 16, wherein an endpoint of a control signal for controlling the radio reception circuit and the endpoint of the data related to the audio are different from each other.

18. The method of claim 11, wherein the determining whether the external electronic device is capable of processing the radio signal includes:
determining whether the external electronic device is capable of processing the radio signal based on a vendor identification (VID) or a product identification (PID) included in data transmitted by the external electronic device when the external electronic device is connected to the USB connector.

19. The method of claim 11, wherein the USB connector is implemented in a form of type C.

* * * * *